(12) United States Patent
Nagano et al.

(10) Patent No.: US 12,536,733 B2
(45) Date of Patent: Jan. 27, 2026

(54) SINGLE-IMAGE INVERSE RENDERING

(71) Applicant: NVIDIA Corporation, Santa Clara, CA (US)

(72) Inventors: Koki Nagano, Playa Vista, CA (US); Eric Ryan Chan, Alameda, CA (US); Sameh Khamis, Alameda, CA (US); Shalini De Mello, San Francisco, CA (US); Tero Tapani Karras, Helsinki (FI); Orazio Gallo, Santa Cruz, CA (US); Jonathan Tremblay, Redmond, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 263 days.

(21) Appl. No.: 17/551,046

(22) Filed: Dec. 14, 2021

(65) Prior Publication Data

US 2023/0081641 A1    Mar. 16, 2023

Related U.S. Application Data

(60) Provisional application No. 63/242,993, filed on Sep. 10, 2021.

(51) Int. Cl.
*G06T 15/08* (2011.01)
*G06N 3/04* (2023.01)
(Continued)

(52) U.S. Cl.
CPC ............... *G06T 15/08* (2013.01); *G06N 3/04* (2013.01); *G06N 3/08* (2013.01); *G06T 17/005* (2013.01); *G06T 17/20* (2013.01)

(58) Field of Classification Search
CPC ....... G06T 15/08; G06T 17/005; G06T 17/20; G06T 7/50; G06T 17/00;
(Continued)

(56) References Cited

U.S. PATENT DOCUMENTS 10,297,070 B1 *  5/2019  Zhu ..................... G06F 18/214
10,885,707 B1 *  1/2021  Fu ............................ G06T 7/60
(Continued)

OTHER PUBLICATIONS

Han et al., "Image-Based 3D Object Reconstruction: State-of-the-Art and Trends in the Deep Learning Era", IEEE transactions on pattern analysis and machine intelligence (Year: 2019).*
(Continued)

*Primary Examiner* — Michael Le
(74) *Attorney, Agent, or Firm* — Zilka-Kotab, P.C.

(57) ABSTRACT

A single two-dimensional (2D) image can be used as input to obtain a three-dimensional (3D) representation of the 2D image. This is done by extracting features from the 2D image by an encoder and determining a 3D representation of the 2D image utilizing a trained 2D convolutional neural network (CNN). Volumetric rendering is then run on the 3D representation to combine features within one or more viewing directions, and the combined features are provided as input to a multilayer perceptron (MLP) that predicts and outputs color (or multi-dimensional neural features) and density values for each point within the 3D representation. As a result, single-image inverse rendering may be performed using only a single 2D image as input to create a corresponding 3D representation of the scene in the single 2D image.

30 Claims, 9 Drawing Sheets

(51) Int. Cl.
*G06N 3/08* (2023.01)
*G06T 17/00* (2006.01)
*G06T 17/20* (2006.01)

(58) Field of Classification Search
CPC ............ G06T 2207/20084; G06N 3/04; G06N 3/08; G06N 3/094; G06N 3/0475; G06N 3/063; G06N 3/084; G06N 3/045; G06N 3/0464

See application file for complete search history.

(56) References Cited

U.S. PATENT DOCUMENTS

| | | | | |
|---|---|---|---|---|
| 2014/0009466 | A1* | 1/2014 | Tzur | G06T 15/04 345/420 |
| 2019/0261945 | A1* | 8/2019 | Funka-Lea | A61B 8/483 |
| 2020/0388071 | A1* | 12/2020 | Grabner | G06T 17/20 |
| 2021/0027536 | A1* | 1/2021 | Fu | G06V 10/82 |
| 2021/0103776 | A1* | 4/2021 | Jiang | G06V 20/647 |
| 2021/0150757 | A1* | 5/2021 | Mustikovela | G06N 3/08 |
| 2021/0241522 | A1* | 8/2021 | Guler | G06V 10/82 |
| 2021/0248811 | A1* | 8/2021 | Shan | G06T 15/205 |
| 2021/0279952 | A1* | 9/2021 | Chen | G06T 17/00 |
| 2021/0350620 | A1* | 11/2021 | Bronstein | G06N 20/00 |
| 2021/0383241 | A1* | 12/2021 | Karras | G06N 20/00 |
| 2022/0358770 | A1* | 11/2022 | Guler | G06T 7/50 |

OTHER PUBLICATIONS

Hiroharu Kato and Tatsuya Harada, "Self-supervised Learning of 3D Objects from Natural Images", arXiv preprint arXiv:1911.08850, 2019 · arxiv.org (Year: 2019).*

Park et al., "DeepSDF: Learning Continuous Signed Distance Functions for Shape Representation, "CVPR, 2019, pp. 165-174, 2019 (Year: 2019).*

Gafni et al., "Dynamic Neural Radiance Fields for Monocular 4D Facial Avatar Reconstruction, "CVPR, 2021, pp. 8649-8658 (Year: 2021).*

Yu et al., "pixelNeRF: Neural Radiance Fields from One or Few Images," CVPR, 2021, 20 pages, retrieved from https://arxiv.org/abs/2012.02190.

Saito et al., "PIFu: Pixel-Aligned Implicit Function for High-Resolution Clothed Human Digitization," ICCV, 2019, pp. 2304-2314.

Mildenhall et al., "NeRF: Representing Scenes as Neural Radiance Fields for View Synthesis," ECCV, 2020, pp. 1-25, retrieved from https://arxiv.org/abs/2003.08934.

Ramon et al., "H3D-Net: Few-Shot High-Fidelity 3D Head Reconstruction," arXiv, 2021, 10 pages, retrieved from https://arxiv.org/abs/2107.12512.

Wang et al., "One-Shot Free-View Neural Talking-Head Synthesis for Video Conferencing," CVPA, 2021, 16 pages, retrieved from https://arxiv.org/abs/2011.15126.

Zhou et al., "Rotate-and-Render: Unsupervised Photorealistic Face Rotation from Single-View Images," CVPR preprint, 2020, 11 pages, retrieved from https://arxiv.org/abs/2003.08124.

Pan et al., "Do 2D GANs Know 3D Shape? Unsupervised 3D Shape Reconstruction from 2D Image GANs, " ICLR, 2021, pp. 1-18.

Shi et al., "Lifting 2D StyleGAN for 3D-Aware Face Generation," CVPR, 2021, 15 pages, retrieved from https://arxiv.org/abs/2011.13126.

Gafni et al., "Dynamic Neural Radiance Fields for Monocular 4D Facial Avatar Reconstruction," CVPR, 2021, pp. 8649-8658.

Guo et al., "AD-NeRF: Audio Driven Neural Radiance Fields for Talking Head Synthesis," arXiv, 2021, 11 pages, retrieved from https://arxiv.org/abs/2103.11078.

* cited by examiner

SINGLE-IMAGE INVERSE RENDERING

GOVERNMENT SUPPORT CLAUSE

This invention was made with Government support under Agreement No. HR00112030005, awarded by DARPA. The Government has certain rights in the invention.

FIELD OF THE INVENTION

The present invention relates to image rendering, and more particularly to generating a three-dimensional model from a two-dimensional image.

BACKGROUND

Inverse rendering is a valuable process in which a three-dimensional (3D) scene is generated utilizing two-dimensional (2D) images. However, current methods for performing inverse rendering have significant limitations. For example, current methods for learning volumetric 3D representations require multiple 2D images from different viewpoints, as well as ground truth 3D geometry during training. Current methods also require lengthy scene-specific optimization processes and do not run in real-time. Current methods also assume target specific priors, such as a human head, require a category specific pretrained model, or do not generate a full 3D scene representation.

There is therefore a need to perform inverse rendering by generating a three-dimensional (3D) representation of a single 2D image.

DETAILED DESCRIPTION

A single two-dimensional (2D) image (such as an image obtained from a camera) can be used as input to obtain a three-dimensional (3D) representation of the 2D image. This is done by extracting features from the 2D image by an encoder, and determining a 3D representation of the 2D image utilizing a trained 2D convolutional neural network (CNN). Volumetric rendering is then run on the 3D representation to combine features within one or more viewing directions, and the combined features are provided as input to a multilayer perceptron (MLP) that predicts and outputs color (or multi-dimensional neural features) and density values for each point within the 3D representation.

As a result, single-image inverse rendering may be performed using only a single 2D image as input to create a corresponding 3D representation of the scene in the single 2D image.

Figure 1:
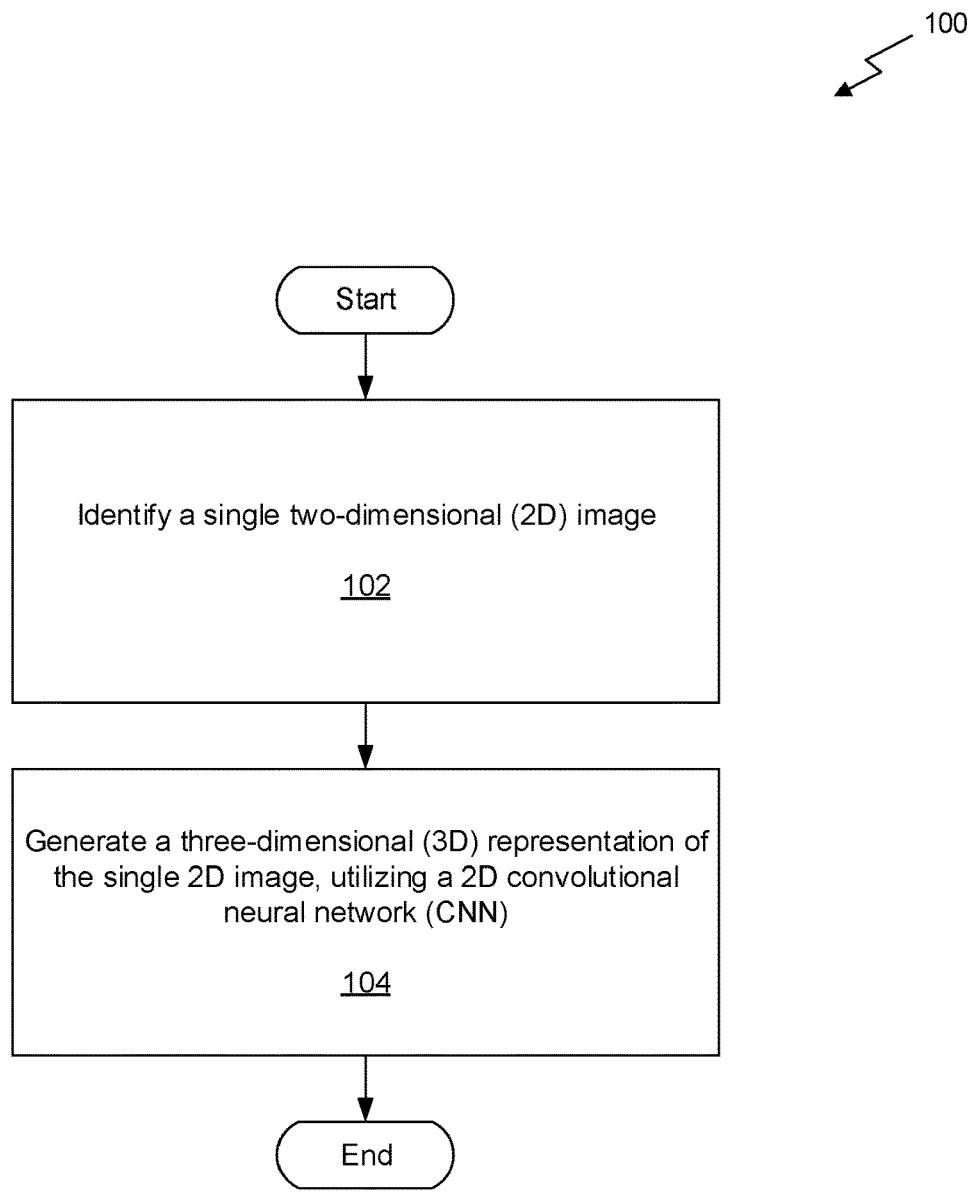
FIG. 1 illustrates a flowchart of a method for performing single-image inverse rendering, in accordance with an embodiment.

FIG. 1 illustrates a flowchart of a method 100 for performing single-image inverse rendering, in accordance with an embodiment. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), or any processing element. Furthermore, persons of ordinary skill in the art will understand that any system that performs method 100 is within the scope and spirit of embodiments of the present invention.

As shown in operation 102, a single two-dimensional (2D) image is identified. In one embodiment, the single 2D image may include a picture of one or more objects (e.g., one or more people, vehicles, buildings, animals, terrain, etc.). In another embodiment, the single 2D image may be created utilizing a camera (e.g., a mobile device camera, a camera mounted on a vehicle, etc.). Of course, however, the single 2D image may be identified in any manner. For example, the single 2D image may be downloaded from the Internet, captured by a camera, it painted by a human, created by another neural net, etc.

Additionally, as shown in operation 104, a three-dimensional (3D) representation of the single 2D image is generated utilizing a 2D convolutional neural network (CNN). In one embodiment, the single 2D image may be input into an encoder, which may extract one or more features at each point within the single 2D image. In another embodiment, the features extracted by the encoder may be input into the 2D CNN.

For example, the 2D CNN may include a decoder. In another example, the 2D CNN may include a trained generative adversarial network (GAN). In yet another example, the 2D CNN may take the extracted features as input and may output the 3D representation of a scene found within the 2D image.

Further, in one embodiment, the 3D representation may include a hybrid explicit-implicit model. For example, the 3D representation may include a plurality of sparse 2D neural planes oriented in 3D space in an axis-aligned manner (e.g., a 3-plane representation).

Further still, in one embodiment, the 3D representation may include a tree structure. In another embodiment, the 3D representation may include a dense voxel structure. For example, the 3D representation may include a plurality of dense voxels in a discretized space.

Also, in one embodiment, volumetric rendering may be run on the 3D representation to aggregate neural features within one or more viewing directions. In another embodiment, aggregated neural features may be provided as input to a multilayer perceptron (MLP). For example, the MLP may include a feedforward artificial neural network (ANN). In another example, the MLP may predict and output color and density values for each point within the 3D representation. In yet another embodiment, the MLP decoder may directly predict the final RGB color, or the MLP decoder may predict multi-dimensional neural features, and those neural features can be fed into one or more additional layers (e.g., a 2D CNN) for further refinement, where these additional layers may predict the final RGB color using the predicted multi-dimensional neural features.

In addition, in one embodiment, the 3D representation of the single 2D image may be generated in real-time. In another embodiment, additional layers may be run on the output of the MLP to further refine the output. In yet another embodiment, multiple 2D images may be input instead of a single 2D image, and the 3D representation may be generated based on the multiple 2D images.

Furthermore, in one embodiment, a signed distance function (SDF) may be used to determine a 3D surface of the aggregated neural features, and the MLP may be used to determine color values (or multi-dimensional neural features) for each point within the 3D representation. In another embodiment, the generated 3D representation of a scene illustrated in the single 2D image may be used to perform one or more navigation actions (e.g., autonomous vehicle or object navigation, etc.). In yet another embodiment, the generated 3D representation of a scene illustrated in the single 2D image may be used within one or more gaming environments (e.g., as a user avatar, etc.).

Further still, the 3D representation of the single 2D image may be generated utilizing one or more local computing devices, one or more networked/distributed computing devices, one or more cloud-computing devices, etc.

In this way, single-image inverse rendering may be performed using only a single 2D image as input to create a 3D representation of a scene illustrated in the single 2D image. This may avoid the need for dataset-specific prior information when training the 2D CNN to generate the 3D representation, and may also allow access to a diverse array of 2D imagery for 3D conversion. The creation of the 3D representation may be performed in a feedforward manner (e.g., without having to perform per-scene optimization), which may improve a performance of computing hardware implementing the above 3D representation generation.

Figure 2:
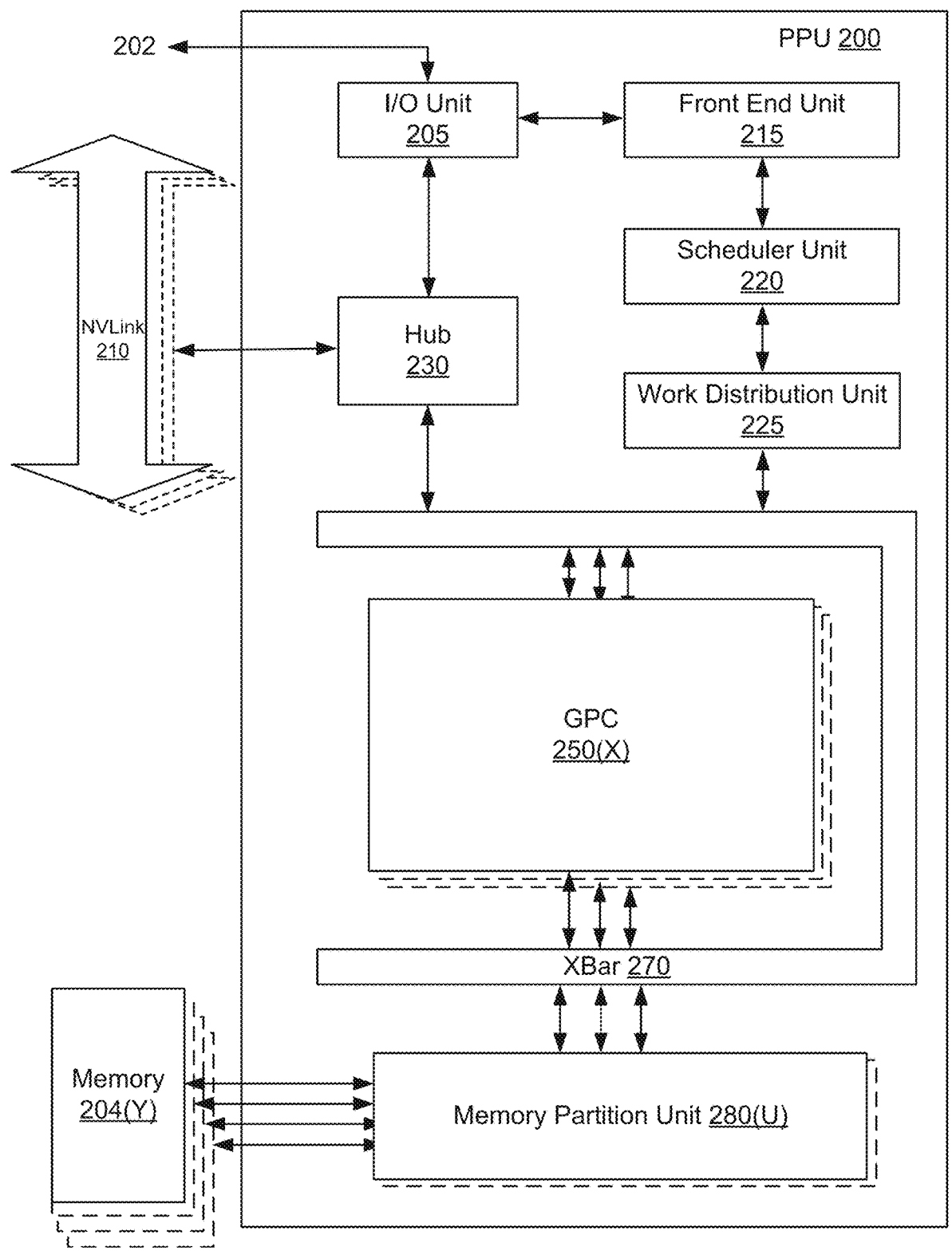
FIG. 2 illustrates a parallel processing unit, in accordance with an embodiment.

In yet another embodiment, the above functionality may be performed utilizing a parallel processing unit (PPU) such as the PPU 200 illustrated in FIG. 2.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

FIG. 2 illustrates a parallel processing unit (PPU) 200, in accordance with an embodiment. In an embodiment, the PPU 200 is a multi-threaded processor that is implemented on one or more integrated circuit devices. The PPU 200 is a latency hiding architecture designed to process many threads in parallel. A thread (i.e., a thread of execution) is an instantiation of a set of instructions configured to be executed by the PPU 200. In an embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 200 may be configured to accelerate thousands of High Performance Computing (HPC), data center, and machine learning applications. The PPU 200 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 2, the PPU 200 includes an Input/Output (I/O) unit 205, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other PPUs 200 via one or more high-speed NVLink 210 interconnect. The PPU 200 may be connected to a host processor or other peripheral devices via an interconnect 202. The PPU 200 may also be connected to a local memory comprising a number of memory devices 204. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 210 interconnect enables systems to scale and include one or more PPUs 200 combined with one or more CPUs, supports cache coherence between the PPUs 200 and CPUs, and CPU mastering. Data and/or commands may be transmitted by the NVLink 210 through the hub 230 to/from other units of the PPU 200 such as one or more copy engines, a video encoder, a video decoder, a power management unit, etc. (not explicitly shown). The NVLink 210 is described in more detail in conjunction with FIG. 4B.

The I/O unit 205 is configured to transmit and receive communications (i.e., commands, data, etc.) from a host processor (not shown) over the interconnect 202. The I/O unit 205 may communicate with the host processor directly via the interconnect 202 or through one or more intermediate devices such as a memory bridge. In an embodiment, the I/O unit 205 may communicate with one or more other processors, such as one or more the PPUs 200 via the interconnect 202. In an embodiment, the I/O unit 205 implements a Peripheral Component Interconnect Express (PCIe) interface for communications over a PCIe bus and the interconnect 202 is a PCIe bus. In alternative embodiments, the I/O unit 205 may implement other types of well-known interfaces for communicating with external devices.

The I/O unit 205 decodes packets received via the interconnect 202. In an embodiment, the packets represent commands configured to cause the PPU 200 to perform various operations. The I/O unit 205 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the I/O unit 205 is configured to route communications between and among the various logical units of the PPU 200.

In an embodiment, a program executed by the host processor encodes a command stream in a buffer that provides workloads to the PPU 200 for processing. A workload may comprise several instructions and data to be processed by those instructions. The buffer is a region in a memory that is accessible (i.e., read/write) by both the host processor and the PPU 200. For example, the I/O unit 205 may be configured to access the buffer in a system memory connected to the interconnect 202 via memory requests transmitted over the interconnect 202. In an embodiment, the host processor writes the command stream to the buffer and then transmits a pointer to the start of the command stream to the PPU 200. The front end unit 215 receives pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In an embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 may also be connected to the XBar 270 via the hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. The results can be transmitted to another PPU 200 or CPU via the NVLink 210. In an embodiment, the PPU 200 includes a number U of partition units 280 that is equal to the number of separate and distinct memory devices 204 coupled to the PPU 200. A partition unit 280 will be described in more detail below in conjunction with FIG. 3B.

In an embodiment, a host processor executes a driver kernel that implements an application programming interface (API) that enables one or more applications executing on the host processor to schedule operations for execution on the PPU 200. In an embodiment, multiple compute applications are simultaneously executed by the PPU 200 and the PPU 200 provides isolation, quality of service (QoS), and independent address spaces for the multiple compute applications. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 4A.

Figure 3A:
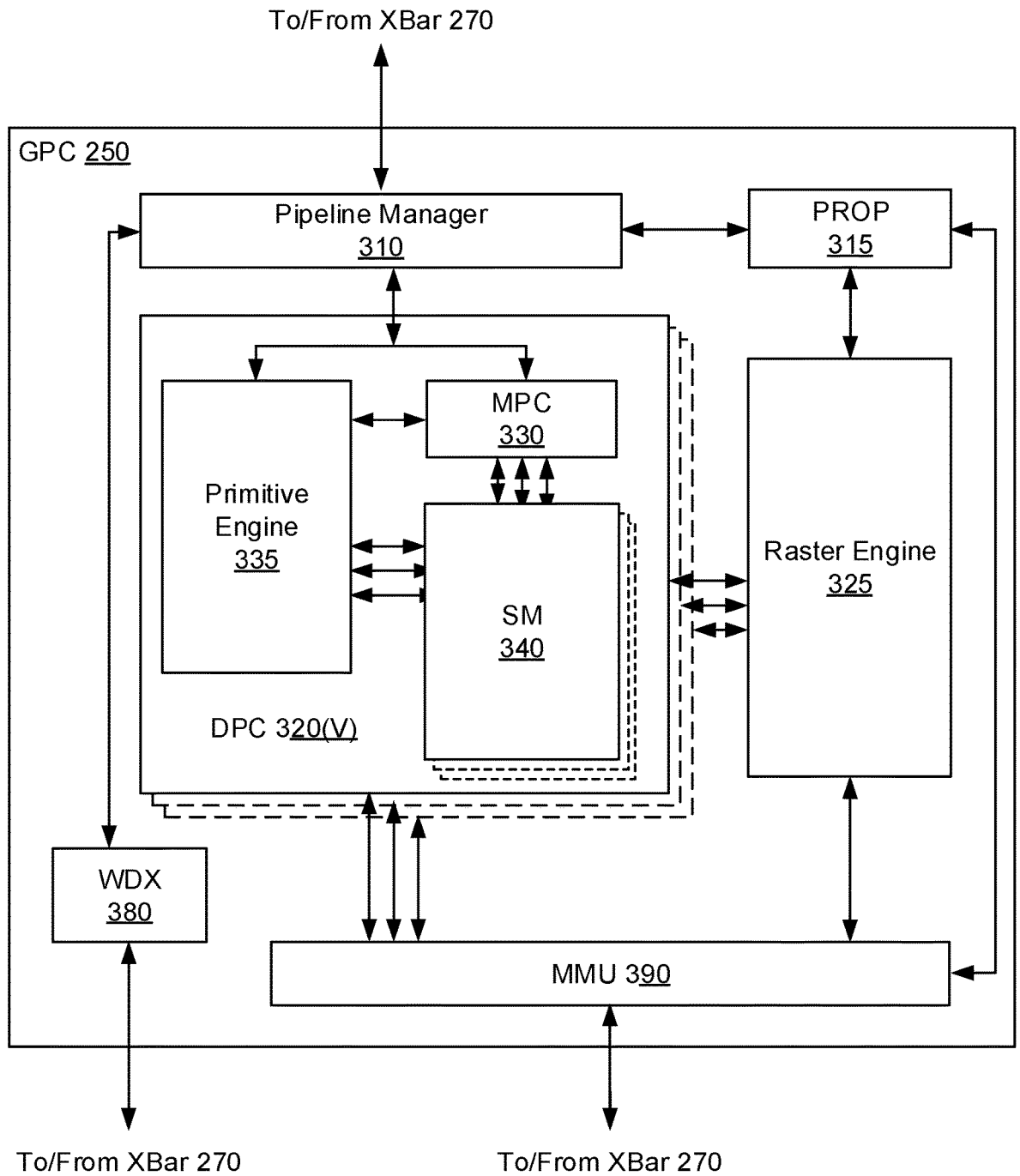
FIG. 3A illustrates a general processing cluster within the parallel processing unit of FIG. 2, in accordance with an embodiment.

FIG. 3A illustrates a GPC 250 of the PPU 200 of FIG. 2, in accordance with an embodiment. As shown in FIG. 3A, each GPC 250 includes a number of hardware units for processing tasks. In an embodiment, each GPC 250 includes a pipeline manager 310, a pre-raster operations unit (PROP) 315, a raster engine 325, a work distribution crossbar (WDX) 380, a memory management unit (MMU) 390, and one or more Data Processing Clusters (DPCs) 320. It will be appreciated that the GPC 250 of FIG. 3A may include other hardware units in lieu of or in addition to the units shown in FIG. 3A.

In an embodiment, the operation of the GPC 250 is controlled by the pipeline manager 310. The pipeline manager 310 manages the configuration of the one or more DPCs 320 for processing tasks allocated to the GPC 250. In an embodiment, the pipeline manager 310 may configure at least one of the one or more DPCs 320 to implement at least a portion of a graphics rendering pipeline. For example, a DPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the DPCs 320 for processing by the primitive engine 335 or the SM 340. In an embodiment, the pipeline manager 310 may configure at least one of the one or more DPCs 320 to implement a neural network model and/or a computing pipeline.

Figure 3B:
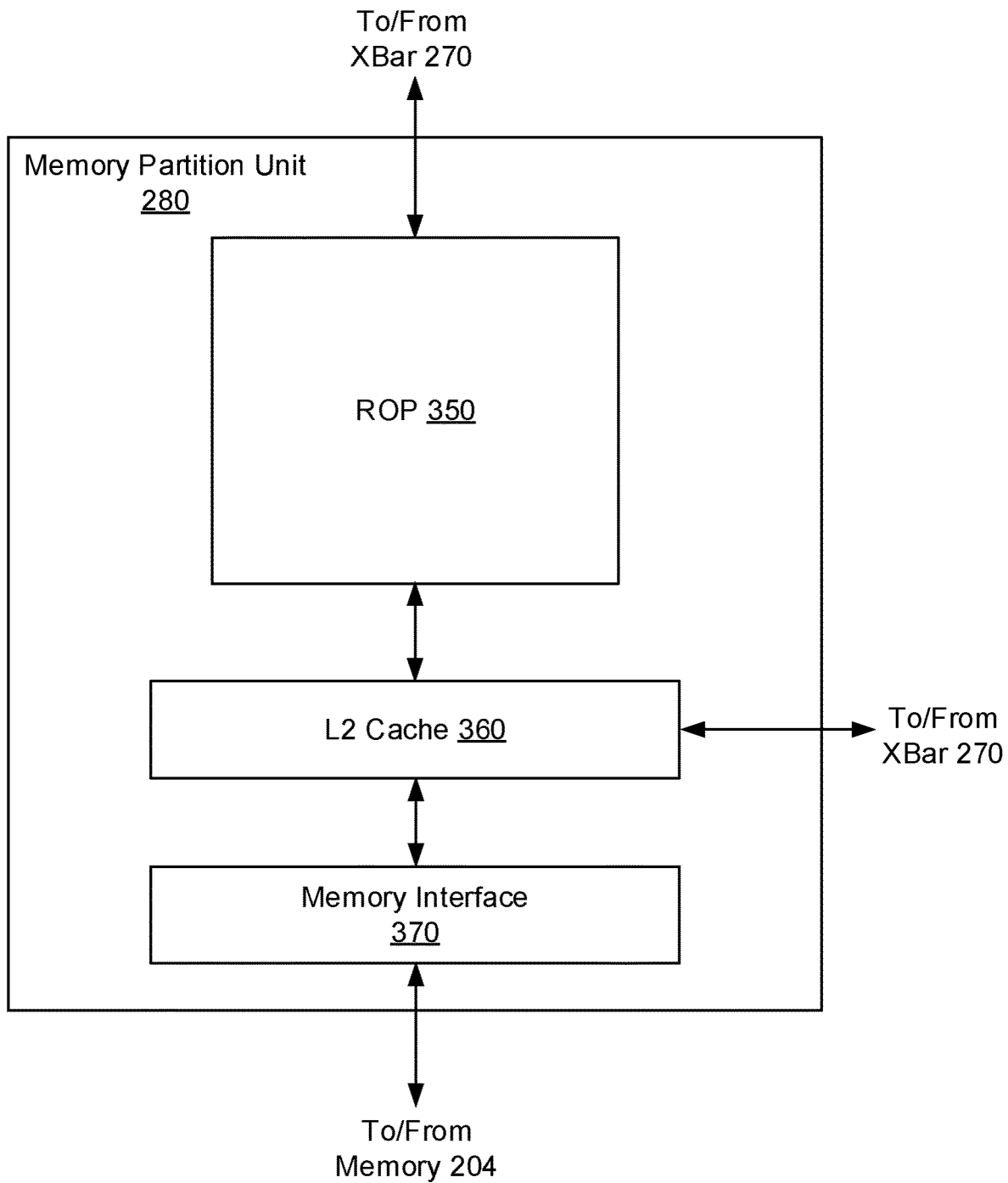
FIG. 3B illustrates a memory partition unit of the parallel processing unit of FIG. 2, in accordance with an embodiment.

The PROP unit 315 is configured to route data generated by the raster engine 325 and the DPCs 320 to a Raster Operations (ROP) unit, described in more detail in conjunction with FIG. 3B. The PROP unit 315 may also be configured to perform optimizations for color blending, organize pixel data, perform address translations, and the like.

The raster engine 325 includes a number of fixed function hardware units configured to perform various raster operations. In an embodiment, the raster engine 325 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 325 comprises fragments to be processed, for example, by a fragment shader implemented within a DPC 320.

Each DPC 320 included in the GPC 250 includes an M-Pipe Controller (MPC) 330, a primitive engine 335, and one or more SMs 340. The MPC 330 controls the operation of the DPC 320, routing packets received from the pipeline manager 310 to the appropriate units in the DPC 320. For example, packets associated with a vertex may be routed to the primitive engine 335, which is configured to fetch vertex attributes associated with the vertex from the memory 204. In contrast, packets associated with a shader program may be transmitted to the SM 340.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In an embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 340 will be described in more detail below in conjunction with FIG. 4A.

The MMU 390 provides an interface between the GPC 250 and the partition unit 280. The MMU 390 may provide translation of virtual addresses into physical addresses, memory protection, and arbitration of memory requests. In an embodiment, the MMU 390 provides one or more translation lookaside buffers (TLBs) for performing translation of virtual addresses into physical addresses in the memory 204.

FIG. 3B illustrates a memory partition unit 280 of the PPU 200 of FIG. 2, in accordance with an embodiment. As shown in FIG. 3B, the memory partition unit 280 includes a Raster Operations (ROP) unit 350, a level two (L2) cache 360, and a memory interface 370. The memory interface 370 is coupled to the memory 204. Memory interface 370 may implement 32, 64, 128, 1024-bit data buses, or the like, for high-speed data transfer. In an embodiment, the PPU 200 incorporates U memory interfaces 370, one memory interface 370 per pair of partition units 280, where each pair of partition units 280 is connected to a corresponding memory device 204. For example, PPU 200 may be connected to up to Y memory devices 204, such as high bandwidth memory stacks or graphics double-data-rate, version 5, synchronous dynamic random access memory, or other types of persistent storage.

In an embodiment, the memory interface 370 implements an HBM2 memory interface and Y equals half U. In an embodiment, the HBM2 memory stacks are located on the same physical package as the PPU 200, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 204 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 200 process very large datasets and/or run applications for extended periods.

In an embodiment, the PPU 200 implements a multi-level memory hierarchy. In an embodiment, the memory partition unit 280 supports a unified memory to provide a single unified virtual address space for CPU and PPU 200 memory, enabling data sharing between virtual memory systems. In an embodiment the frequency of accesses by a PPU 200 to memory located on other processors is traced to ensure that memory pages are moved to the physical memory of the PPU 200 that is accessing the pages more frequently. In an embodiment, the NVLink 210 supports address translation services allowing the PPU 200 to directly access a CPU's page tables and providing full access to CPU memory by the PPU 200.

In an embodiment, copy engines transfer data between multiple PPUs 200 or between PPUs 200 and CPUs. The copy engines can generate page faults for addresses that are not mapped into the page tables. The memory partition unit 280 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 204 or other system memory may be fetched by the memory partition unit 280 and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 performs graphics raster operations related to pixel color, such as color compression, pixel blending, and the like. The ROP unit 350 also implements depth testing in conjunction with the raster engine 325, receiving a depth for a sample location associated with a pixel fragment from the culling engine of the raster engine 325. The depth is tested against a corresponding depth in a depth buffer for a sample location associated with the fragment. If the fragment passes the depth test for the sample location, then the ROP unit 350 updates the depth buffer and transmits a result of the depth test to the raster engine 325. It will be appreciated that the number of partition units 280 may be different than the number of GPCs 250 and, therefore, each ROP unit 350 may be coupled to each of the GPCs 250. The ROP unit 350 tracks packets received from the different GPCs 250 and determines which GPC 250 that a result generated by the ROP unit 350 is routed to through the Xbar 270. Although the ROP unit 350 is included within the memory partition unit 280 in FIG. 3B, in other embodiment, the ROP unit 350 may be outside of the memory partition unit 280. For example, the ROP unit 350 may reside in the GPC 250 or another unit.

Figure 4A:
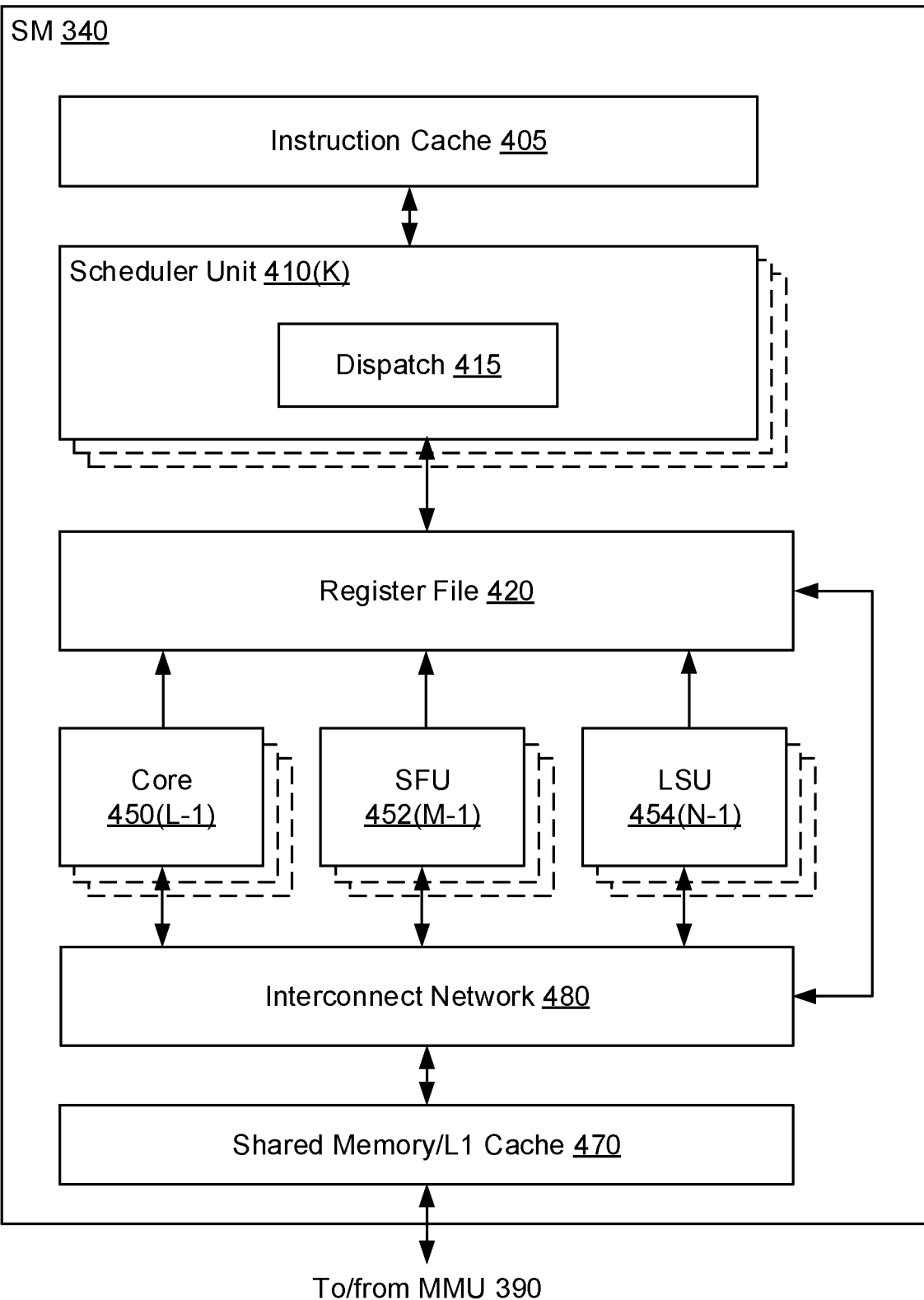
FIG. 4A illustrates the streaming multi-processor of FIG. 3A, in accordance with an embodiment.

FIG. 4A illustrates the streaming multi-processor 340 of FIG. 3A, in accordance with an embodiment. As shown in FIG. 4A, the SM 340 includes an instruction cache 405, one or more scheduler units 410(K), a register file 420, one or more processing cores 450, one or more special function units (SFUs) 452, one or more load/store units (LSUs) 454, an interconnect network 480, a shared memory/L1 cache 470.

As described above, the work distribution unit 225 dispatches tasks for execution on the GPCs 250 of the PPU 200. The tasks are allocated to a particular DPC 320 within a GPC 250 and, if the task is associated with a shader program, the task may be allocated to an SM 340. The scheduler unit 410(K) receives the tasks from the work distribution unit 225 and manages instruction scheduling for one or more thread blocks assigned to the SM 340. The scheduler unit 410(K) schedules thread blocks for execution as warps of parallel threads, where each thread block is allocated at least one warp. In an embodiment, each warp executes 32 threads. The scheduler unit 410(K) may manage a plurality of different thread blocks, allocating the warps to the different thread blocks and then dispatching instructions from the plurality of different cooperative groups to the various functional units (i.e., cores 450, SFUs 452, and LSUs 454) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 415 is configured to transmit instructions to one or more of the functional units. In the embodiment, the scheduler unit 410(K) includes two dispatch units 415 that enable two different instructions from the same warp to be dispatched during each clock cycle. In alternative embodiments, each scheduler unit 410(K) may include a single dispatch unit 415 or additional dispatch units 415.

Each SM 340 includes a register file 420 that provides a set of registers for the functional units of the SM 340. In an embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In an embodiment, the SM 340 includes a large number (e.g., 128, etc.) of distinct processing cores 450. Each core 450 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 450 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 450. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 340 also comprises M SFUs 452 that perform special functions (e.g., attribute evaluation, reciprocal square root, and the like). In an embodiment, the SFUs 452 may include a tree traversal unit configured to traverse a hierarchical tree data structure. In an embodiment, the SFUs 452 may include texture unit configured to perform texture map filtering operations. In an embodiment, the texture units are configured to load texture maps (e.g., a 2D array of texels) from the memory 204 and sample the texture maps to produce sampled texture values for use in shader programs executed by the SM 340. In an embodiment, the texture maps are stored in the shared memory/L1 cache 370. The texture units implement texture operations such as filtering operations using mip-maps (i.e., texture maps of varying levels of detail). In an embodiment, each SM 240 includes two texture units.

Each SM 340 also comprises N LSUs 454 that implement load and store operations between the shared memory/L1 cache 470 and the register file 420. Each SM 340 includes an interconnect network 480 that connects each of the functional units to the register file 420 and the LSU 454 to the register file 420, shared memory/L1 cache 470. In an embodiment, the interconnect network 480 is a crossbar that can be configured to connect any of the functional units to any of the registers in the register file 420 and connect the LSUs 454 to the register file and memory locations in shared memory/L1 cache 470.

The shared memory/L1 cache 470 is an array of on-chip memory that allows for data storage and communication between the SM 340 and the primitive engine 335 and between threads in the SM 340. In an embodiment, the shared memory/L1 cache 470 comprises 128 KB of storage capacity and is in the path from the SM 340 to the partition unit 280. The shared memory/L1 cache 470 can be used to cache reads and writes. One or more of the shared memory/L1 cache 470, L2 cache 360, and memory 204 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 470 enables the shared memory/L1 cache 470 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 2, are bypassed, creating a much simpler programming model. In the general purpose parallel computation configuration, the work distribution unit 225 assigns and distributes blocks of threads directly to the DPCs 320. The threads in a block execute the same program, using a unique thread ID in the calculation to ensure each thread generates unique results, using the SM 340 to execute the program and perform calculations, shared memory/L1 cache 470 to communicate between threads, and the LSU 454 to read and write global memory through the shared memory/L1 cache 470 and the memory partition unit 280. When configured for general purpose parallel computation, the SM 340 can also write commands that the scheduler unit 220 can use to launch new work on the DPCs 320.

The PPU 200 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 200 is embodied on a single semiconductor substrate. In another embodiment, the PPU 200 is included in a system-on-a-chip (SoC) along with one or more other devices such as additional PPUs 200, the memory 204, a reduced instruction set computer (RISC) CPU, a memory management unit (MMU), a digital-to-analog converter (DAC), and the like.

In an embodiment, the PPU 200 may be included on a graphics card that includes one or more memory devices 204. The graphics card may be configured to interface with a PCIe slot on a motherboard of a desktop computer. In yet another embodiment, the PPU 200 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 4B:
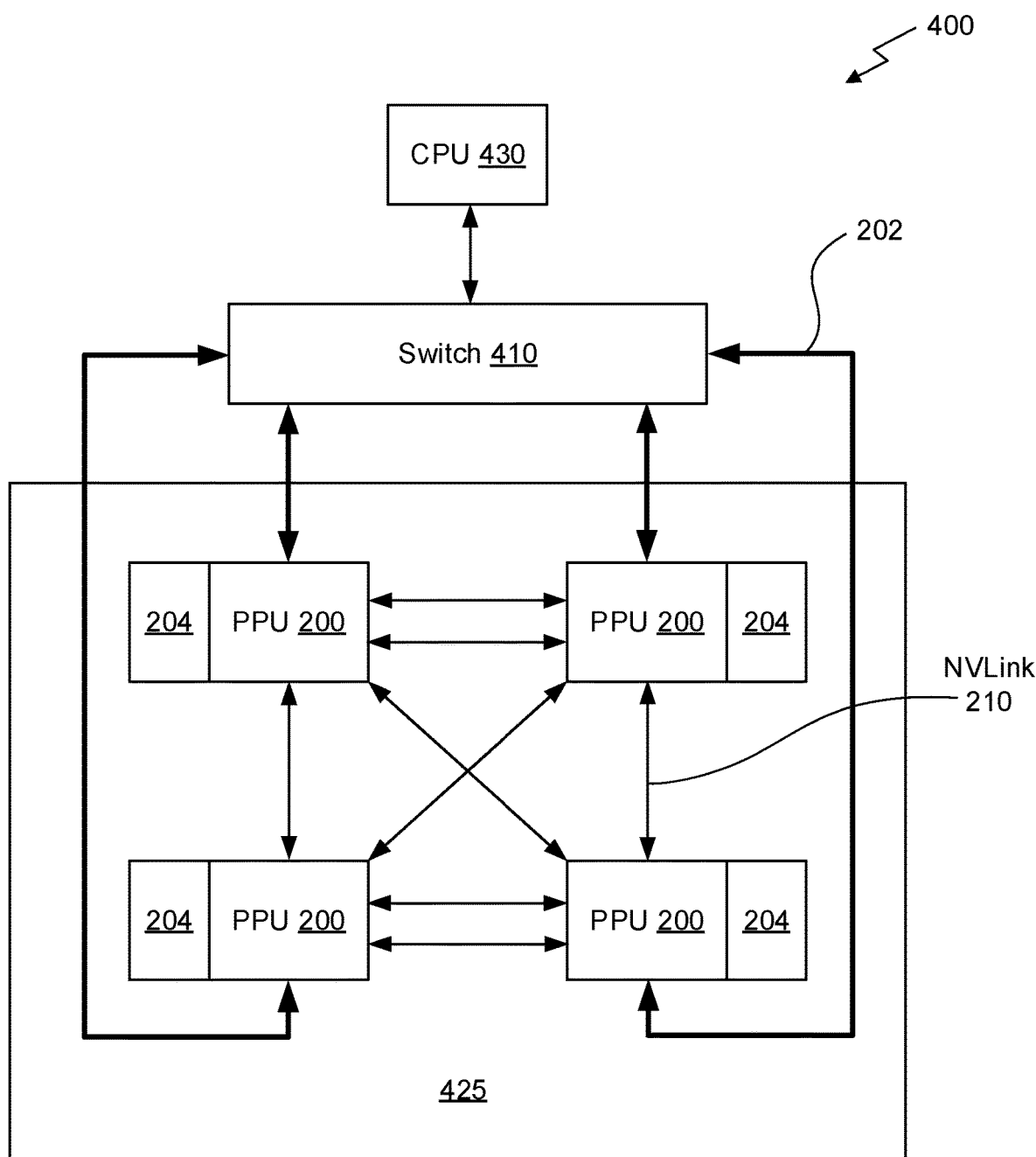
FIG. 4B is a conceptual diagram of a processing system implemented using the PPU of FIG. 2, in accordance with an embodiment.

FIG. 4B is a conceptual diagram of a processing system 400 implemented using the PPU 200 of FIG. 2, in accordance with an embodiment. The exemplary system 465 may be configured to implement the method 100 shown in FIG. 1. The processing system 400 includes a CPU 430, switch 410, and multiple PPUs 200 each and respective memories 204. The NVLink 210 provides high-speed communication links between each of the PPUs 200. Although a particular number of NVLink 210 and interconnect 202 connections are illustrated in FIG. 4B, the number of connections to each PPU 200 and the CPU 430 may vary. The switch 410 interfaces between the interconnect 202 and the CPU 430. The PPUs 200, memories 204, and NVLinks 210 may be situated on a single semiconductor platform to form a parallel processing module 425. In an embodiment, the switch 410 supports two or more protocols to interface between various different connections and/or links.

In another embodiment (not shown), the NVLink 210 provides one or more high-speed communication links between each of the PPUs 200 and the CPU 430 and the switch 410 interfaces between the interconnect 202 and each of the PPUs 200. The PPUs 200, memories 204, and interconnect 202 may be situated on a single semiconductor platform to form a parallel processing module 425. In yet another embodiment (not shown), the interconnect 202 provides one or more communication links between each of the PPUs 200 and the CPU 430 and the switch 410 interfaces between each of the PPUs 200 using the NVLink 210 to provide one or more high-speed communication links between the PPUs 200. In another embodiment (not shown), the NVLink 210 provides one or more high-speed communication links between the PPUs 200 and the CPU 430 through the switch 410. In yet another embodiment (not shown), the interconnect 202 provides one or more communication links between each of the PPUs 200 directly. One or more of the NVLink 210 high-speed communication links may be implemented as a physical NVLink interconnect or either an on-chip or on-die interconnect using the same protocol as the NVLink 210.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 425 may be implemented as a circuit board substrate and each of the PPUs 200 and/or memories 204 may be packaged devices. In an embodiment, the CPU 430, switch 410, and the parallel processing module 425 are situated on a single semiconductor platform.

In an embodiment, the signaling rate of each NVLink 210 is 20 to 25 Gigabits/second and each PPU 200 includes six NVLink 210 interfaces (as shown in FIG. 4B, five NVLink 210 interfaces are included for each PPU 200). Each NVLink 210 provides a data transfer rate of 25 Gigabytes/second in each direction, with six links providing 300 Gigabytes/second. The NVLinks 210 can be used exclusively for PPU-to-PPU communication as shown in FIG. 4B, or some combination of PPU-to-PPU and PPU-to-CPU, when the CPU 430 also includes one or more NVLink 210 interfaces.

In an embodiment, the NVLink 210 allows direct load/store/atomic access from the CPU 430 to each PPU's 200 memory 204. In an embodiment, the NVLink 210 supports coherency operations, allowing data read from the memories 204 to be stored in the cache hierarchy of the CPU 430, reducing cache access latency for the CPU 430. In an embodiment, the NVLink 210 includes support for Address Translation Services (ATS), allowing the PPU 200 to directly access page tables within the CPU 430. One or more of the NVLinks 210 may also be configured to operate in a low-power mode.

Figure 4C:
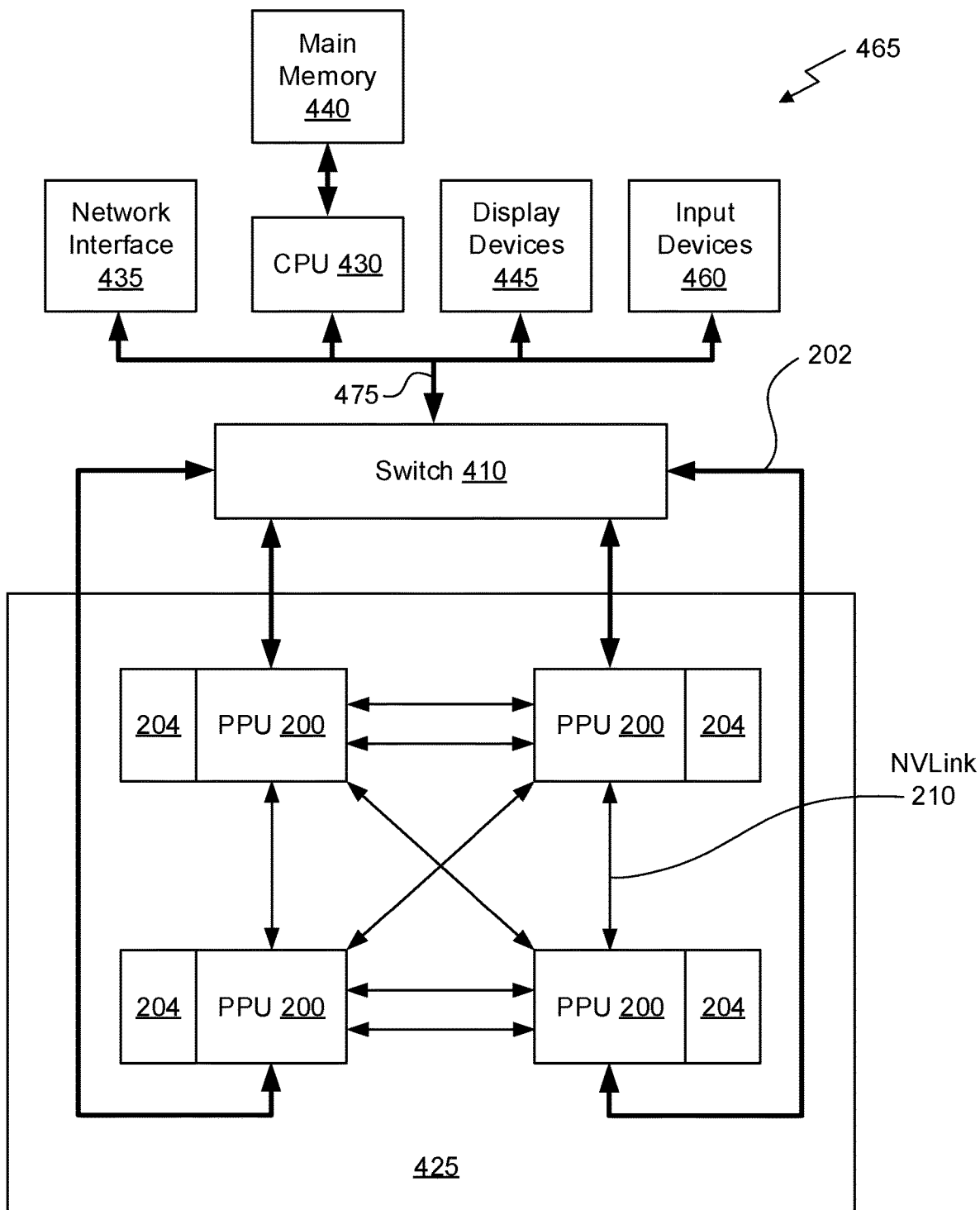
FIG. 4C illustrates an exemplary system in which the various architecture and/or functionality of the various previous embodiments may be implemented.

FIG. 4C illustrates an exemplary system 465 in which the various architecture and/or functionality of the various previous embodiments may be implemented. The exemplary system 465 may be configured to implement the method 100 shown in FIG. 1.

As shown, a system 465 is provided including at least one central processing unit 430 that is connected to a communication bus 475. The communication bus 475 may be implemented using any suitable protocol, such as PCI (Peripheral Component Interconnect), PCI-Express, AGP (Accelerated Graphics Port), HyperTransport, or any other bus or point-to-point communication protocol(s). The system 465 also includes a main memory 440. Control logic (software) and data are stored in the main memory 440 which may take the form of random access memory (RAM).

The system 465 also includes input devices 460, the parallel processing system 425, and display devices 445, i.e. a conventional CRT (cathode ray tube), LCD (liquid crystal display), LED (light emitting diode), plasma display or the like. User input may be received from the input devices 460, e.g., keyboard, mouse, touchpad, microphone, and the like. Each of the foregoing modules and/or devices may even be situated on a single semiconductor platform to form the system 465. Alternately, the various modules may also be situated separately or in various combinations of semiconductor platforms per the desires of the user.

Further, the system 465 may be coupled to a network (e.g., a telecommunications network, local area network (LAN), wireless network, wide area network (WAN) such as the Internet, peer-to-peer network, cable network, or the like) through a network interface 435 for communication purposes.

The system 465 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 440 and/or the secondary storage. Such computer programs, when executed, enable the system 465 to perform various functions. The memory 440, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 465 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 200 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 200. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 200 is a computing platform capable of delivering performance required for deep neural network-based artificial intelligence and machine learning applications.

Exemplary Single-Image Inverse Rendering Environment

Figure 5:
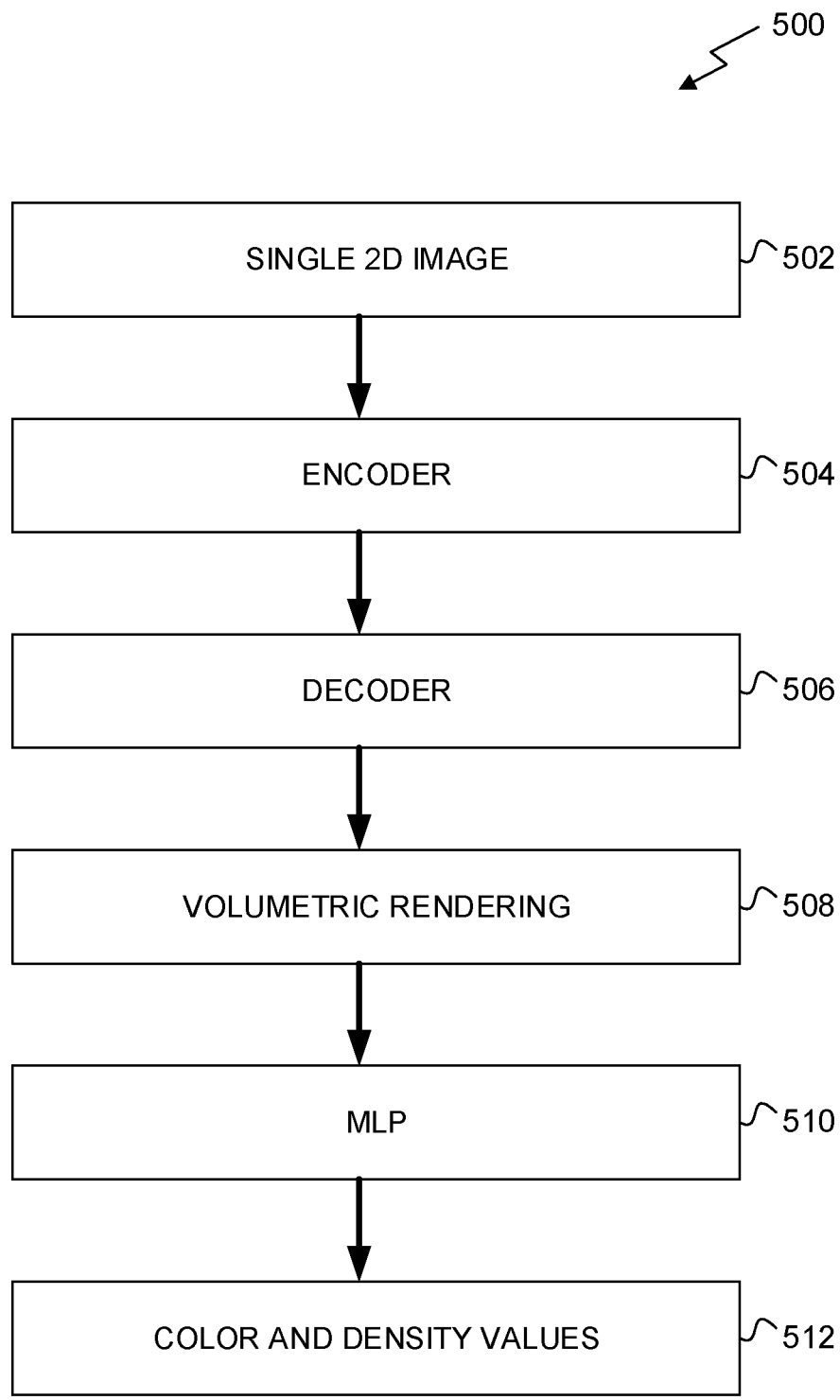
FIG. 5 illustrates an exemplary single-image inverse rendering environment, in accordance with an embodiment.

FIG. 5 illustrates an exemplary single-image inverse rendering environment 500, according to one exemplary embodiment. As shown, a single 2D image 502 is input into an encoder 504, which may extract one or more features at each point within the single 2D image 502. Additionally, the features extracted by the encoder 504 are then input into a decoder 506. In one embodiment, the decoder 506 may include a trained 2D CNN.

Additionally, the decoder 506 may take the extracted features as input and may output the 3D representation of a scene found within the single 2D image 502. Volumetric rendering 508 is then run on the 3D representation to aggregate neural features within one or more viewing directions, and the aggregated neural features are provided as input to a multilayer perceptron (MLP) 510 that predicts and outputs color and density values 512 for each point within the 3D representation.

In this way, single-image inverse rendering may be performed using only a single 2D image 502 as input to create a corresponding 3D representation of the scene in the single 2D image 502. Additionally, one or more of the above components may be implemented within one or more local computing devices, one or more networked/distributed computing devices, one or more cloud-computing devices, etc.

Training a Single-Image Inverse Rendering Environment

Figure 6:
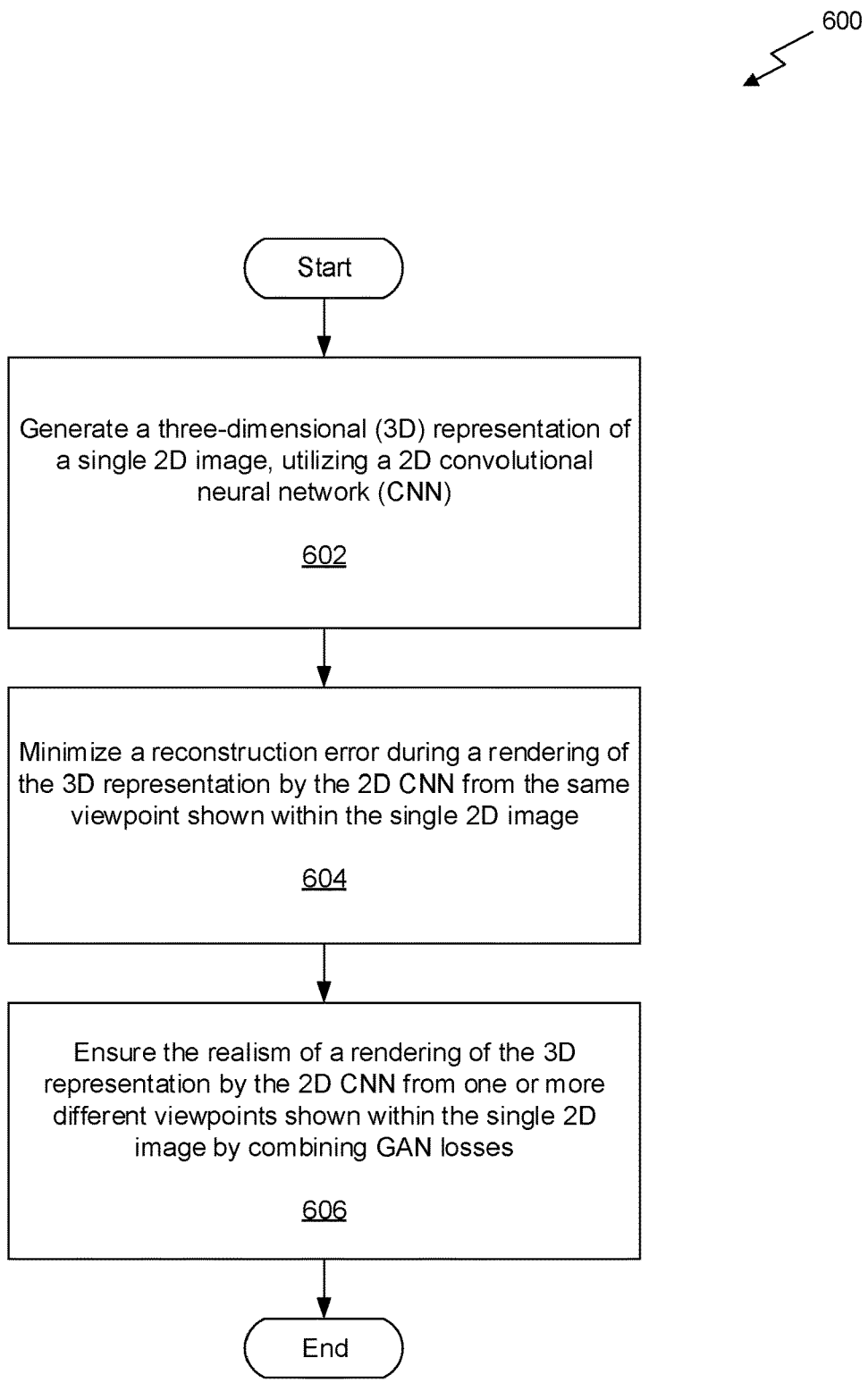
FIG. 6 illustrates a flowchart of a method for training a single-image inverse rendering environment, in accordance with an embodiment.

FIG. 6 illustrates a flowchart of a method 600 for training a single-image inverse rendering environment, in accordance with an embodiment. Although method 600 is described in the context of a processing unit, the method 600 may also be performed by a program, custom circuitry, or by a combination of custom circuitry and a program. For example, the method 600 may be executed by a GPU (graphics processing unit), CPU (central processing unit), or any processing element. Furthermore, persons of ordinary skill in the art will understand that any system that performs method 600 is within the scope and spirit of embodiments of the present invention.

As shown in operation 602, a three-dimensional (3D) representation of a single 2D image is generated utilizing a 2D convolutional neural network (CNN). Additionally, as shown in operation 604, a reconstruction error during a rendering of the 3D representation by the 2D CNN from the same viewpoint shown within the single 2D image is minimized. Further, as shown in operation 606, the realism of a rendering of the 3D representation by the 2D CNN from one or more different viewpoints shown within the single 2D image is ensured by combining GAN losses.

Further still, in one embodiment, the one or more different angles may include arbitrary viewpoint angles of the 3D representation. In another embodiment, same-angle reconstruction error minimization and different-angle rendering realism may be jointly optimized during training. This may result in a convergence that produces 3D representations of 2D images that match the input 2D image when rendered from the same viewpoint as the input 2D image, and that also look realistic/consistent from all viewpoints.

In this way, a 2D CNN may be trained to create realistic 3D representations of 2D images using a single 2D image as input.

Conditional Generative Model for Volumetric Reconstruction

The problem of single-image inverse rendering is addressed herein. Given input images (as few as one image) at test-time, the 3D scene representation may be recovered, allowing for photorealistic novel-view synthesis and 3D geometry extraction. Training may be performed with a self-supervised approach that requires only an unstructured collection of single-view 2D images.

In one embodiment, a conditional generative model is provided for learning volumetric 3D scene representations from a collection of 2D images. During inference, given an input image(s), an exemplary method allows photorealistic novel-view synthesis and 3D geometry extraction conditioned by the input image without requiring target specific tuning or training. For 3D representation, sparse 2D neural planes oriented in 3D space may be conditionally generated from the input image. These neural planes may be generated by high-capacity CNN networks, allowing the model to learn a generalized 3D representation of the scene from 2D images. The final RGB color from an arbitrary view may be rendered by an additional decoder network by volumetric or surface-based rendering. Meshes that capture scene geometry can be obtained through iso-surface extraction from the underlying implicit 3D representation.

To train such a model, a two-part training objective may be utilized. During training, the model may receive an input image and produce a 3D representation. First, to encourage consistency between the input image and the 3D representation, the reconstruction error between the input image and a rendering from the same viewpoint as the input image pose may be minimized. The reconstruction loss may ensure that when rendered from the same pose as the input, the rendering matches the input image (e.g., the conditioned 3D scene representation is indeed consistent with the input image).

Secondly, random additional poses may be sampled around the 3D scene and renderings of the 3D representation may be produced. An adversarial training objective may be leveraged to encourage these renderings to match the distribution of real images from our dataset. Unlike methods that require multi-view supervision, the error to any specific image may not be minimized, but the realness of these additional renderings may be maximized, ensuring the model rendering looks as realistic as the real images from any viewpoints.

As a result, given an input image, an exemplary model produces a 3D scene representation. A rendering from the same view may be constrained to match the input and renderings from additional views may be optimized to look like real images from a training dataset. Over the course of training, this joint objective encourages 3D representations that both match the input image and look realistic when rendered from novel views.

Additionally, in one embodiment, given one or more input images, a plausible 3D reconstruction of a scene may be generated, from which novel views and 3D scene geometry may be extracted. This single-view inverse rendering may be approached as a problem of conditional generation. A Generative Adversarial Network (GAN) may be provided that, conditioned on an input image, generates a 3D scene representation from which novel views and geometry may be extracted.

Some advantages of this approach include the following:
Requires only single-view ground-truth, enabling training from image datasets such as FFHQ (no multi-view images or 3D scans needed).
Only requires a feed forward call at inference, enabling fast, near-real-time synthesis. No per-scene optimization.
Requires no dataset-specific priors, (e.g., can operate on frontal-face images, cars from 360° angles, and other scenes without significant modification).

In one embodiment, a hybrid explicit-implicit model may be used for a 3D representation. In another embodiment, sparse 2D neural planes may be used that are generated by CNN+compact MLP-based decoder which volumetrically aggregates neural features along the viewing direction to produce the final RGB color or multi-dimensional neural features. In another embodiment, additional layers (e.g., 2D CNN) may be applied on top of the RGB color or multi-dimensional neural features to refine the output. Hybrid explicit-implicit models may provide increased performance during both inference and training.

Also, in one embodiment, a training method grounded in adversarial training may be utilized. This training method encourages scene representations that both match the input image and produce realistic renderings from all angles, and also encourages the synthesis of scene representations that plausibly reflect the input.

For example, conditioned on an input image, a model may generate a 3D scene representation. When neural rendered from the same pose as the input camera, the rendered result should exactly match the input image. The images are encouraged to match by minimizing reconstruction error.

When rendered from any novel pose, the rendering of the 3D representation should look realistic. This realism is encouraged using a GAN loss. Joint training converges to 3D representations that match the input image when rendered from the input view and look consistent from all views.

Unlike a traditional training strategy such as multi-view supervision, the above method allows training from single-view image collections such as FFHQ.

In one embodiment, a conditional training objective may be provided for learning volumetric 3D representation from a collection of single-view 2D images. Conditional 3D representations may be implemented using sparse neural planes using 2D CNNs. Real-time volumetric view synthesis may be conditioned by an input image or signals (e.g., a video conferencing (talking head), landmarks, Facial Action Coding System (FACS) signals, speech audio, text, etc.). The generic 3D representation may include a volumetric representation (e.g., cars, complex/multiple object scenes, etc.).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising, at a device:
    training a two-dimensional (2D) convolutional neural network (CNN) to generate a three-dimensional (3D) representation of a given single 2D image by:
        minimizing a reconstruction error between a 2D image selected from a dataset of single-view 2D images and a first rendering of a corresponding 3D representation produced for the 2D image, and
        using an adversarial training objective to encourage one or more second renderings of the corresponding 3D representation to match a distribution of the single-view 2D images in the dataset.

2. The method of claim 1, wherein the 2D image and the first rendering are from a same viewpoint.

3. The method of claim 2, wherein the one or more second renderings are from a different viewpoint than the 2D image.

4. The method of claim 3, wherein the different viewpoint is arbitrary.

5. The method of claim 1, wherein the adversarial training objective combines GAN losses.

6. The method of claim 5, wherein the adversarial training objective ensures realism of a rendering the 3D representation from one or more viewpoints different from a viewpoint shown within the given single 2D image.

7. The method of claim 1, wherein the training is self-supervised.

8. The method of claim 1, wherein the corresponding 3D representation produced for the 2D image is a hybrid explicit-implicit model.

9. The method of claim 8, the corresponding 3D representation produced for the 2D image is a 3-plane representation.

10. The method of claim 9, wherein the 3-plane representation includes a plurality of sparse 2D neural planes oriented in 3D space in an axis-aligned manner.

11. The method of claim 1, wherein the corresponding 3D representation produced for the 2D image is a tree structure.

12. The method of claim 1, wherein the corresponding 3D representation produced for the 2D image is a dense voxel structure.

13. The method of claim 1, wherein the trained 2D CNN is a decoder.

14. The method of claim 1, wherein the trained 2D CNN is a generative adversarial network (GAN).

15. The method of claim 1, wherein the 2D CNN is trained to process features extracted from the given single 2D image to generate the 3D representation of a scene found within the given single 2D image.

16. The method of claim 1, further comprising, at the device:
    outputting the trained 2D CNN.

17. The method of claim 16, wherein outputting the trained 2D CNN includes deploying the 2D CNN for use in generating the 3D representation of the given single 2D image.

18. The method of claim 16, wherein the 2D CNN is deployed to a local computing device.

19. The method of claim 16, wherein the 2D CNN is deployed to one or more networked or distributed computing devices.

20. The method of claim 16, wherein the 2D CNN is deployed to one or more cloud-computing devices.

21. The method of claim 1, wherein volumetric rendering is run on the corresponding 3D representation to aggregate neural features within one or more viewing directions.

22. The method of claim 21, wherein a signed distance function (SDF) is used to determine a 3D surface of the aggregated neural features, and an MLP is used to determine color values or multi-dimensional neural features for each point within the corresponding 3D representation.

23. A system comprising:
    a hardware processor of a device that is configured to:
    train a two-dimensional (2D) convolutional neural network (CNN) to generate a three-dimensional (3D) representation of a given single 2D image by:
        minimizing a reconstruction error between a 2D image selected from a dataset of single-view 2D images and a first rendering of a corresponding 3D representation produced for the 2D image, and
        using an adversarial training objective to encourage one or more second renderings of the corresponding 3D representation to match a distribution of the single-view 2D images in the dataset.

24. The system of claim 23, wherein the 2D image and the first rendering are from a same viewpoint.

25. The system of claim 23, wherein the one or more second renderings are from a different viewpoint than the 2D image.

26. The system of claim 25, wherein the different viewpoint is arbitrary.

27. A non-transitory computer-readable storage medium storing instructions that, when executed by a processor of a device, causes the processor to cause the device to:
    train a two-dimensional (2D) convolutional neural network (CNN) to generate a three-dimensional (3D) representation of a given single 2D image by:
        minimizing a reconstruction error between a 2D image selected from a dataset of single-view 2D images and a first rendering of a corresponding 3D representation produced for the 2D image, and
        using an adversarial training objective to encourage one or more second renderings of the corresponding 3D representation to match a distribution of the single-view 2D images in the dataset.

28. The non-transitory computer-readable storage medium of claim 27, wherein the adversarial training objective combines GAN losses.

29. The non-transitory computer-readable storage medium of claim 28, wherein the adversarial training objective ensures realism of a rendering the 3D representation from one or more viewpoints different from a viewpoint shown within the given single 2D image.

30. The non-transitory computer-readable storage medium of claim 27, wherein the training is self-supervised.

* * * * *